Nov. 12, 1946.  H. E. PRUITT  2,411,110
METALWORKING MACHINE
Filed Dec. 3, 1942  14 Sheets-Sheet 11
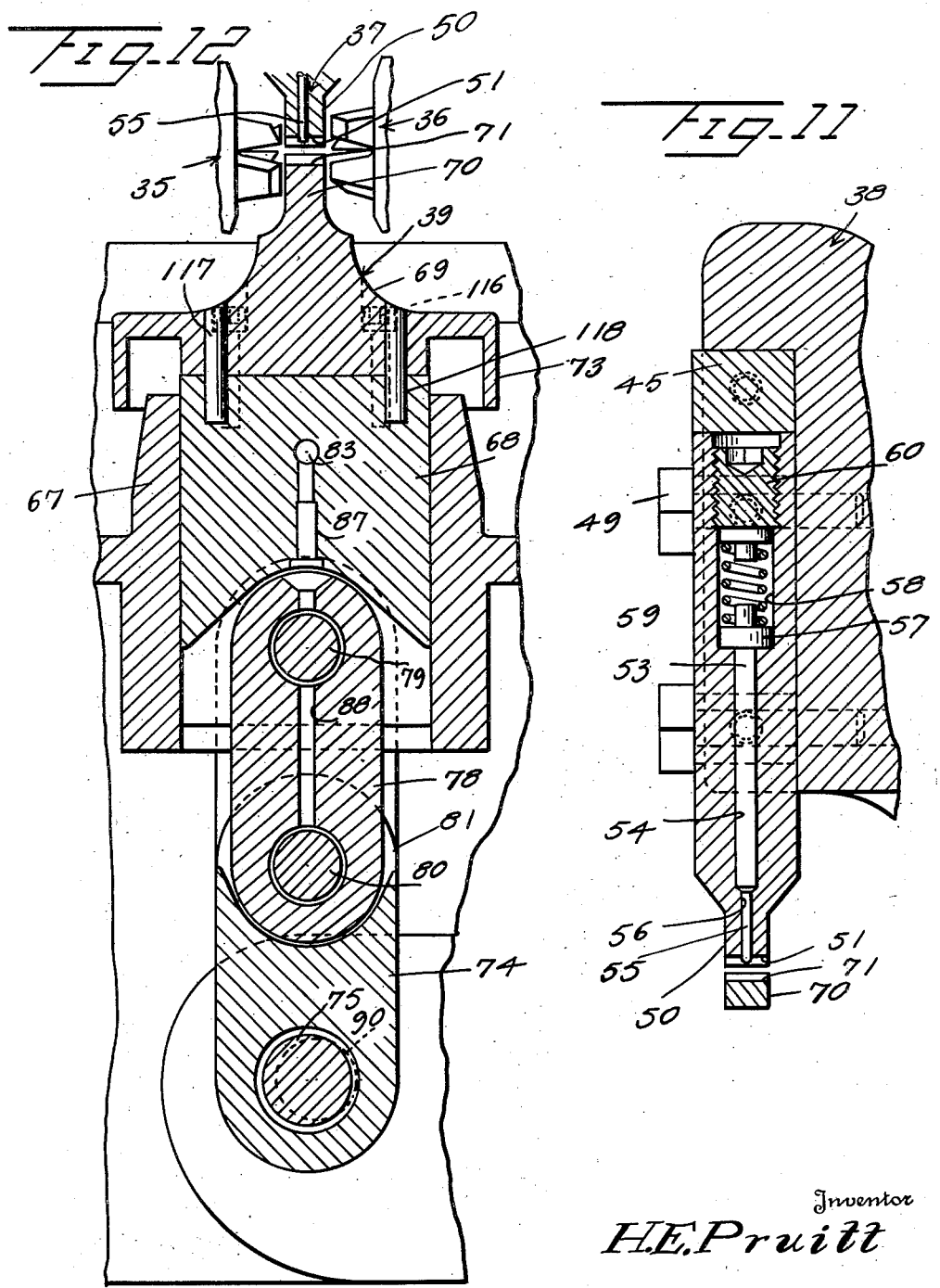

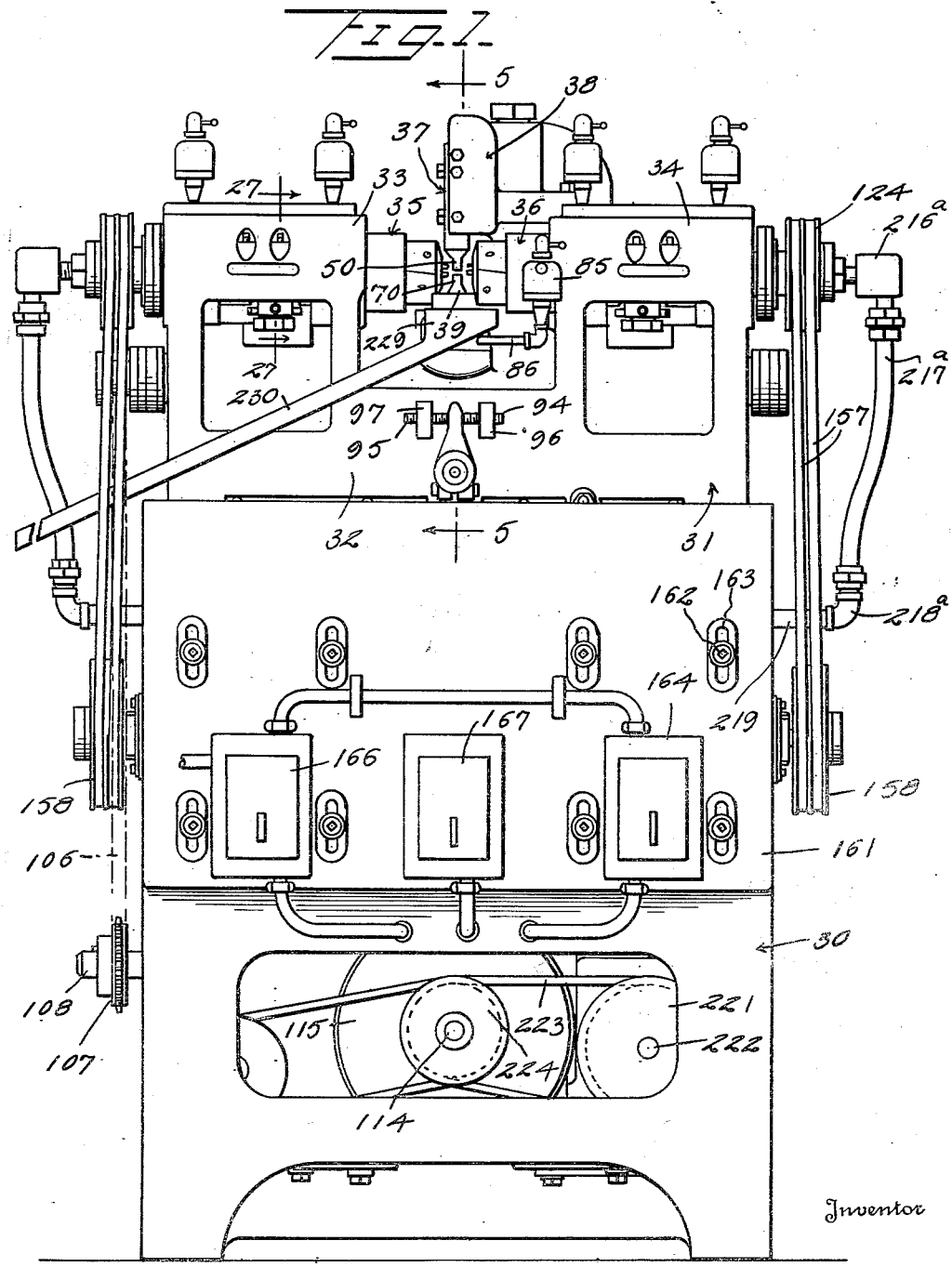

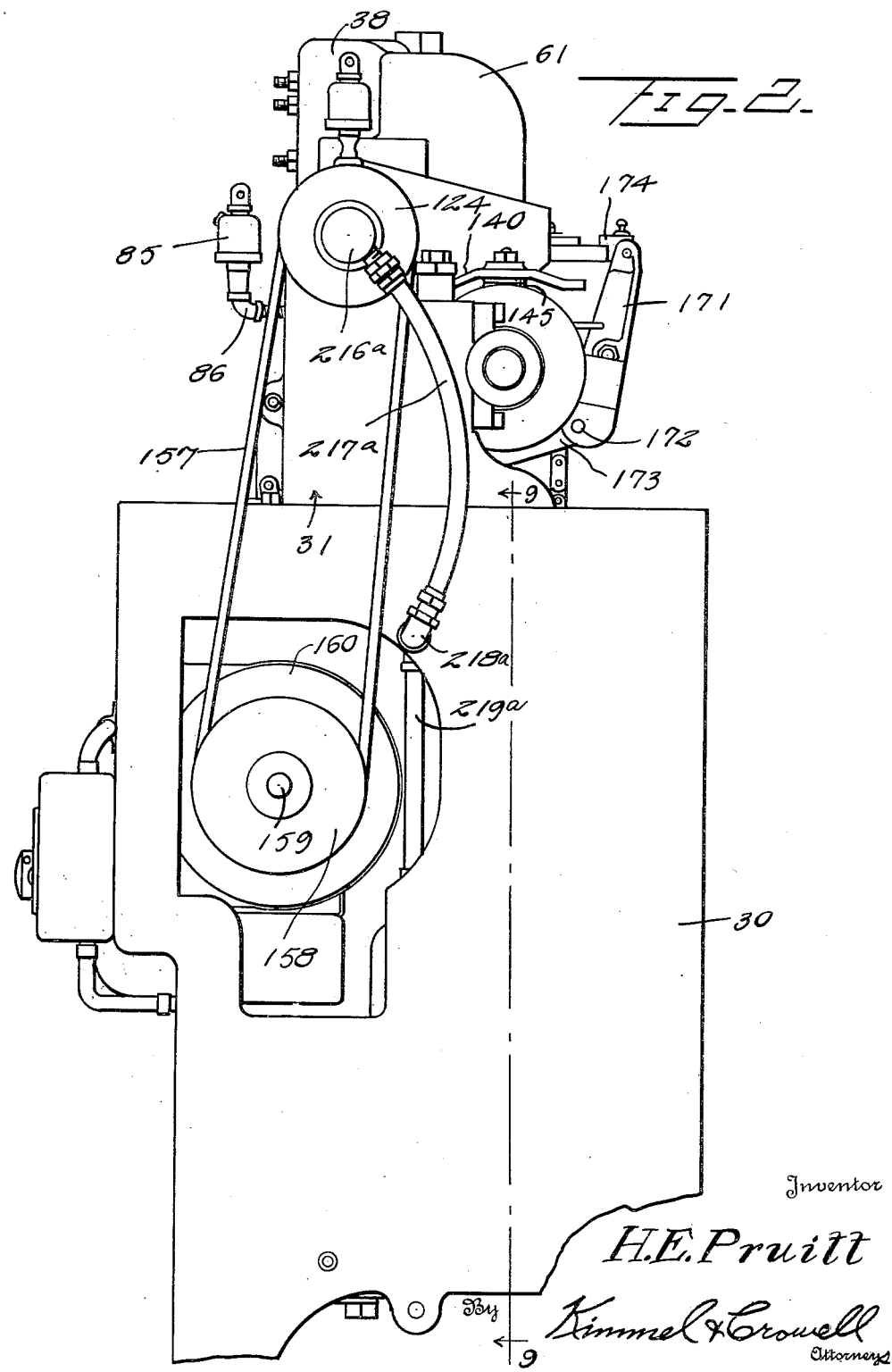

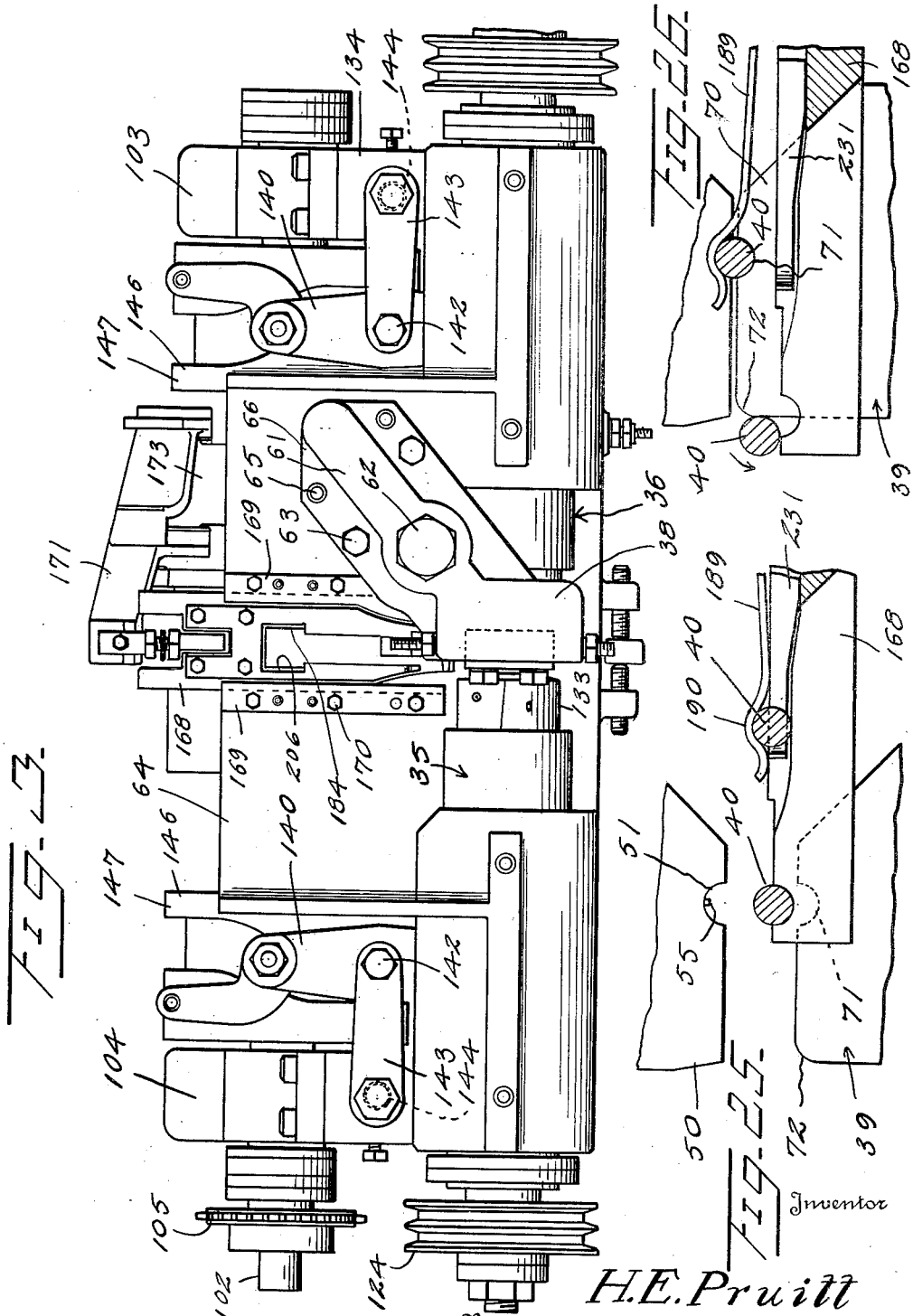

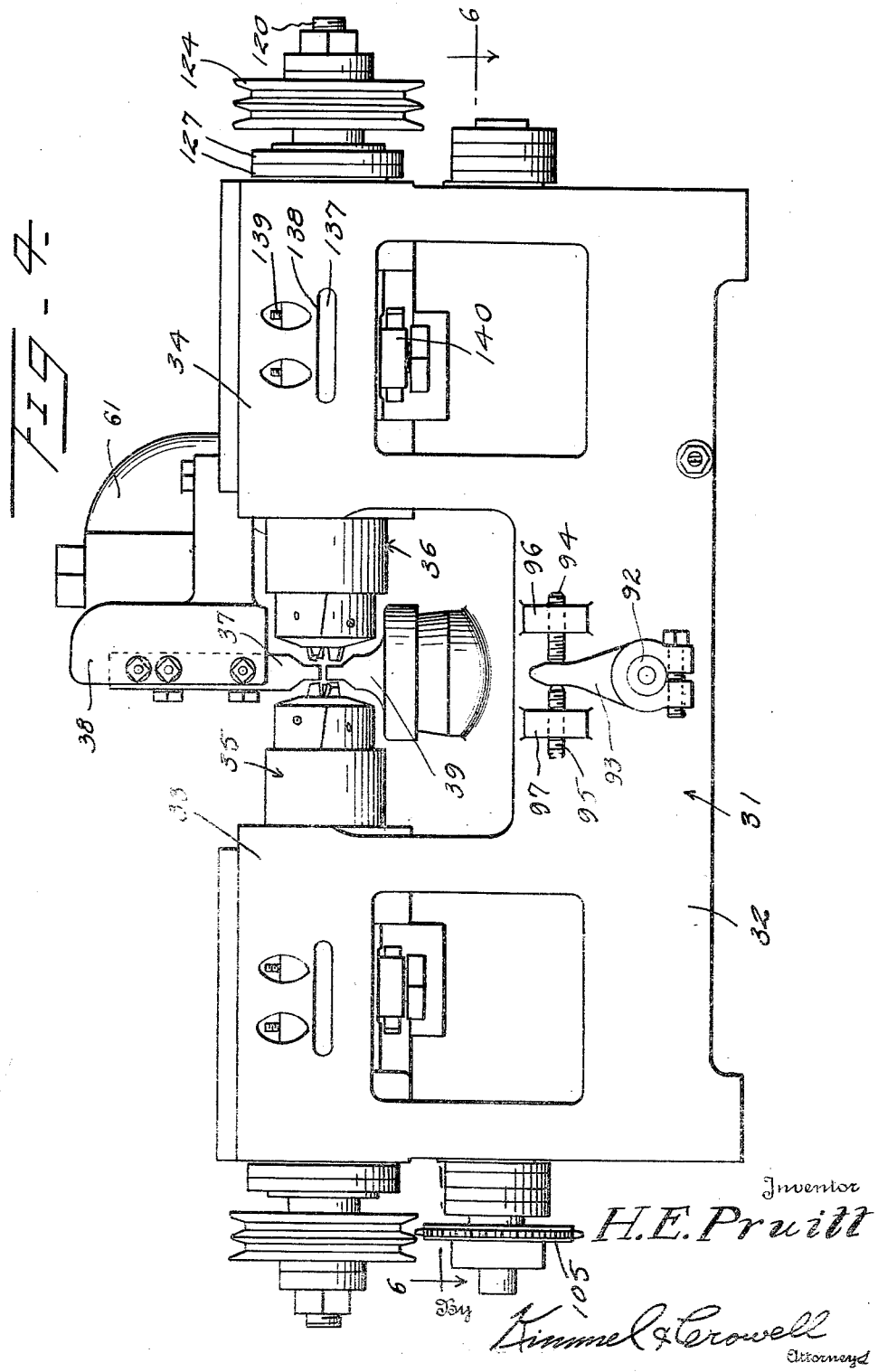

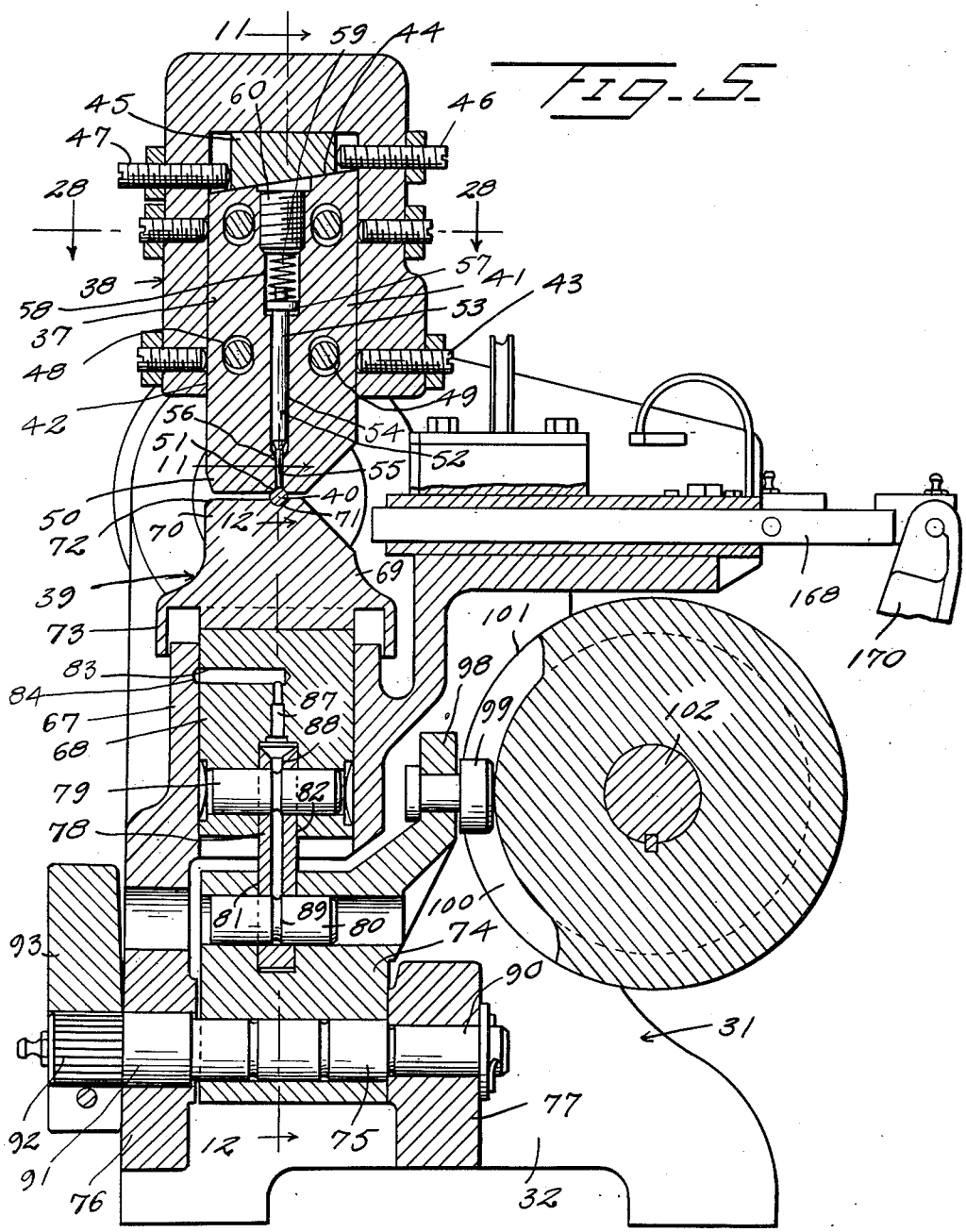

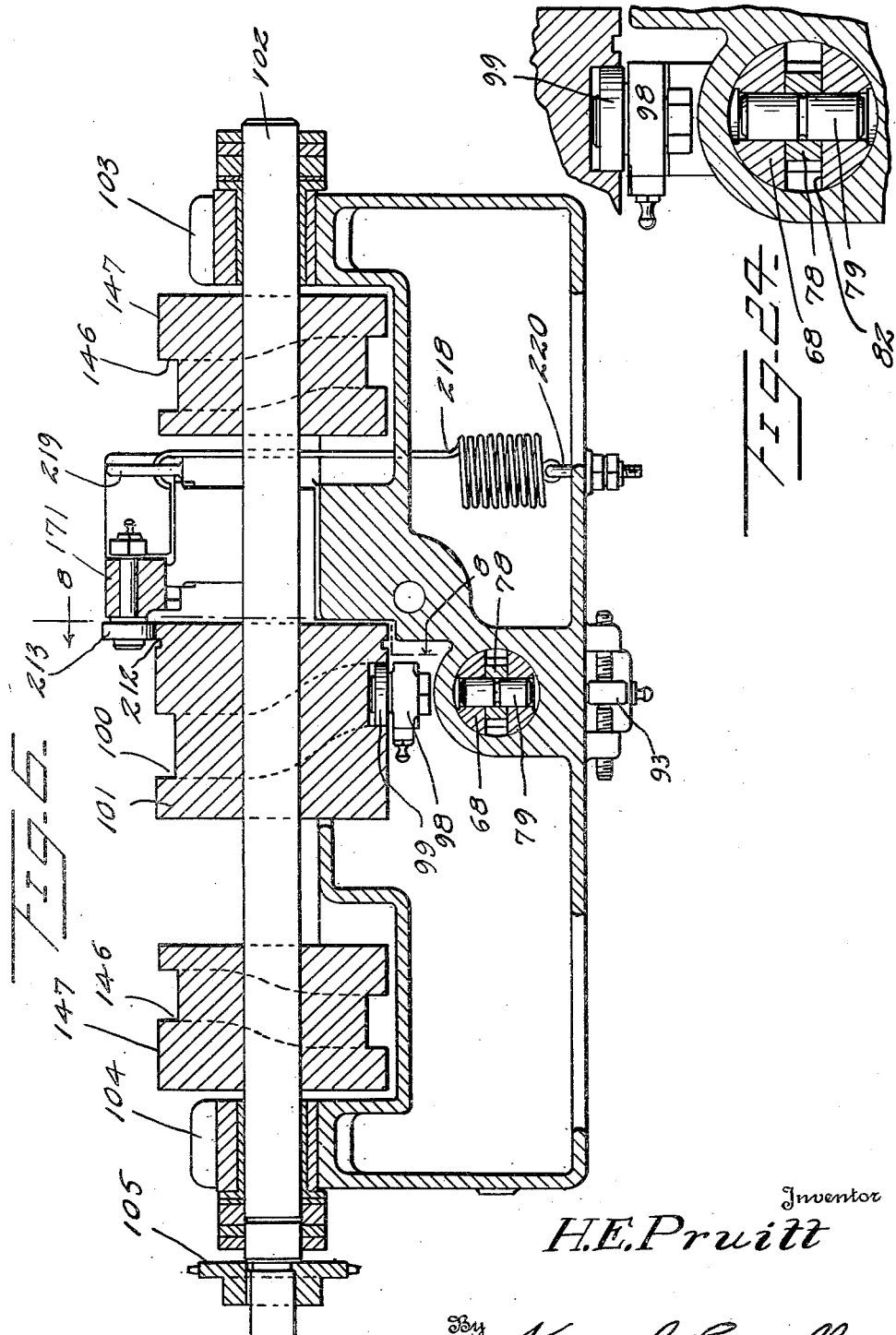

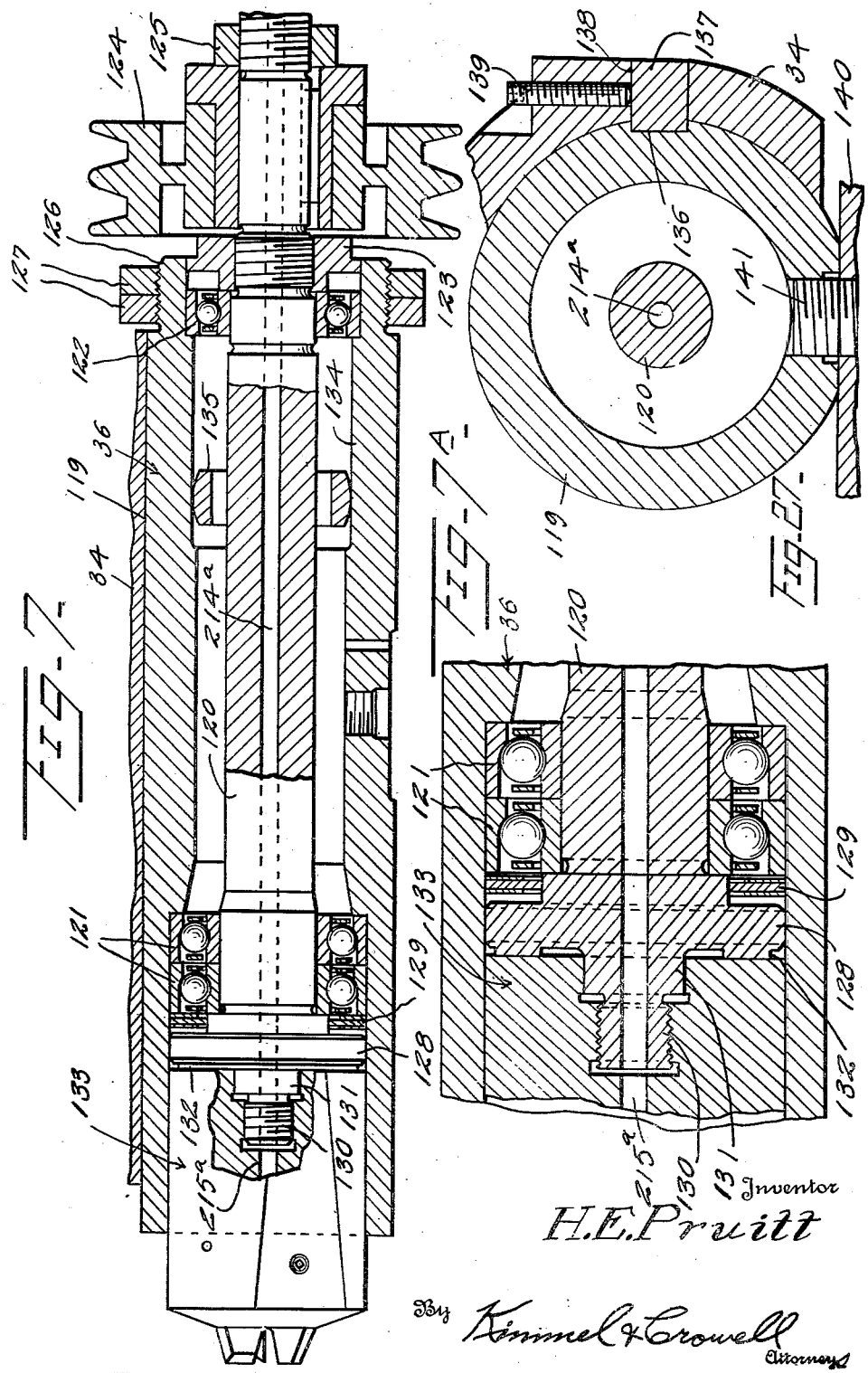

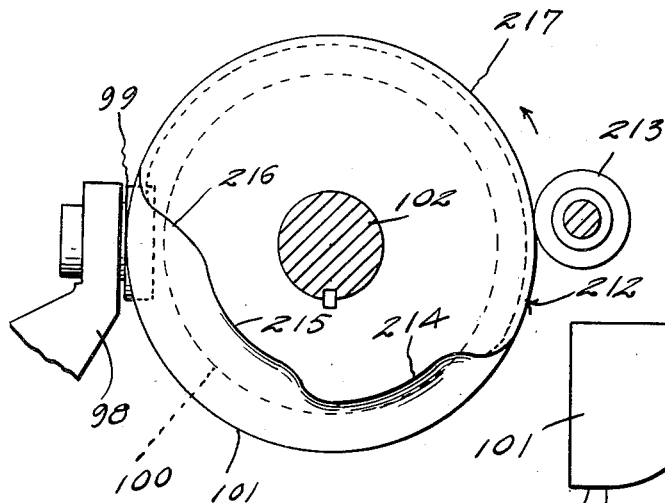
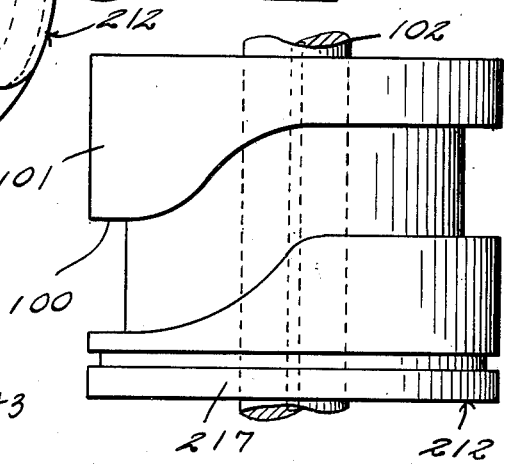
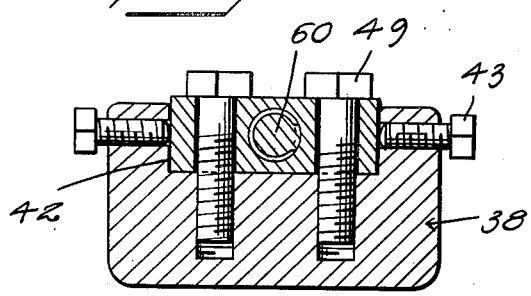
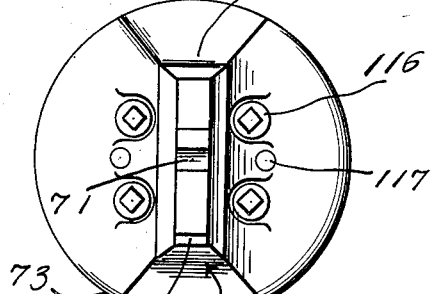
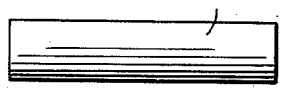
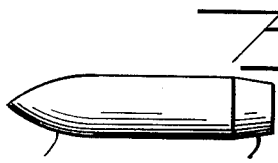

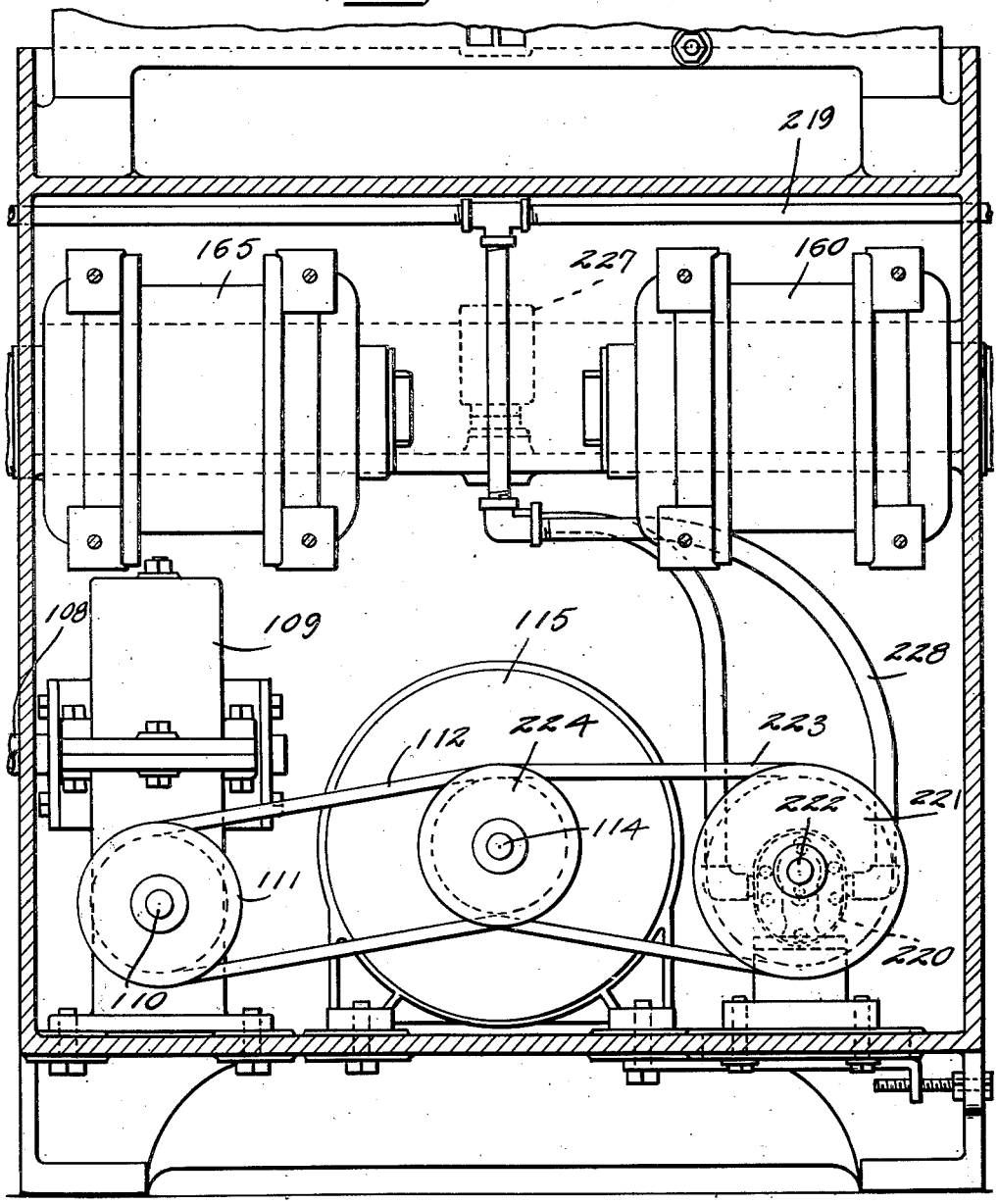

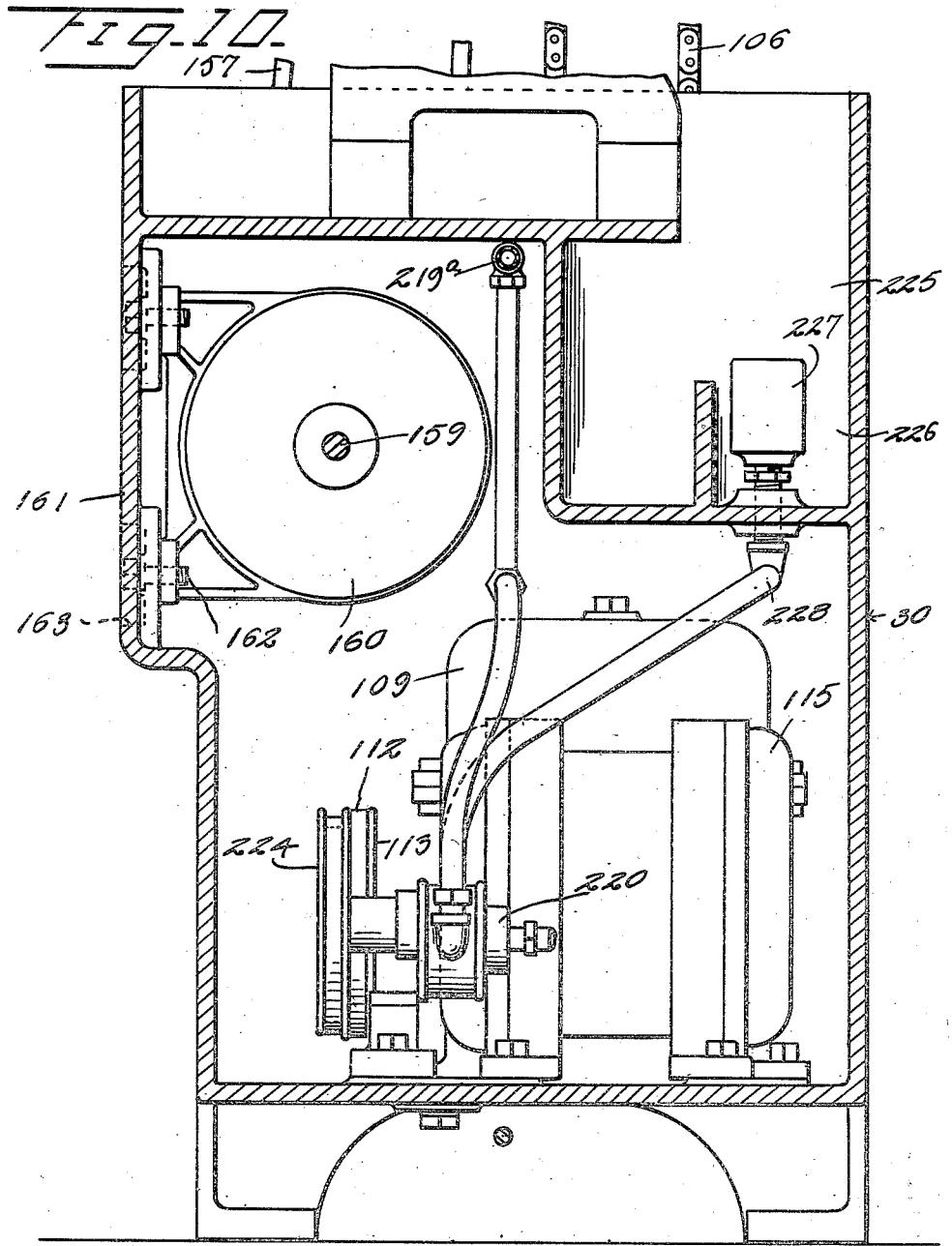

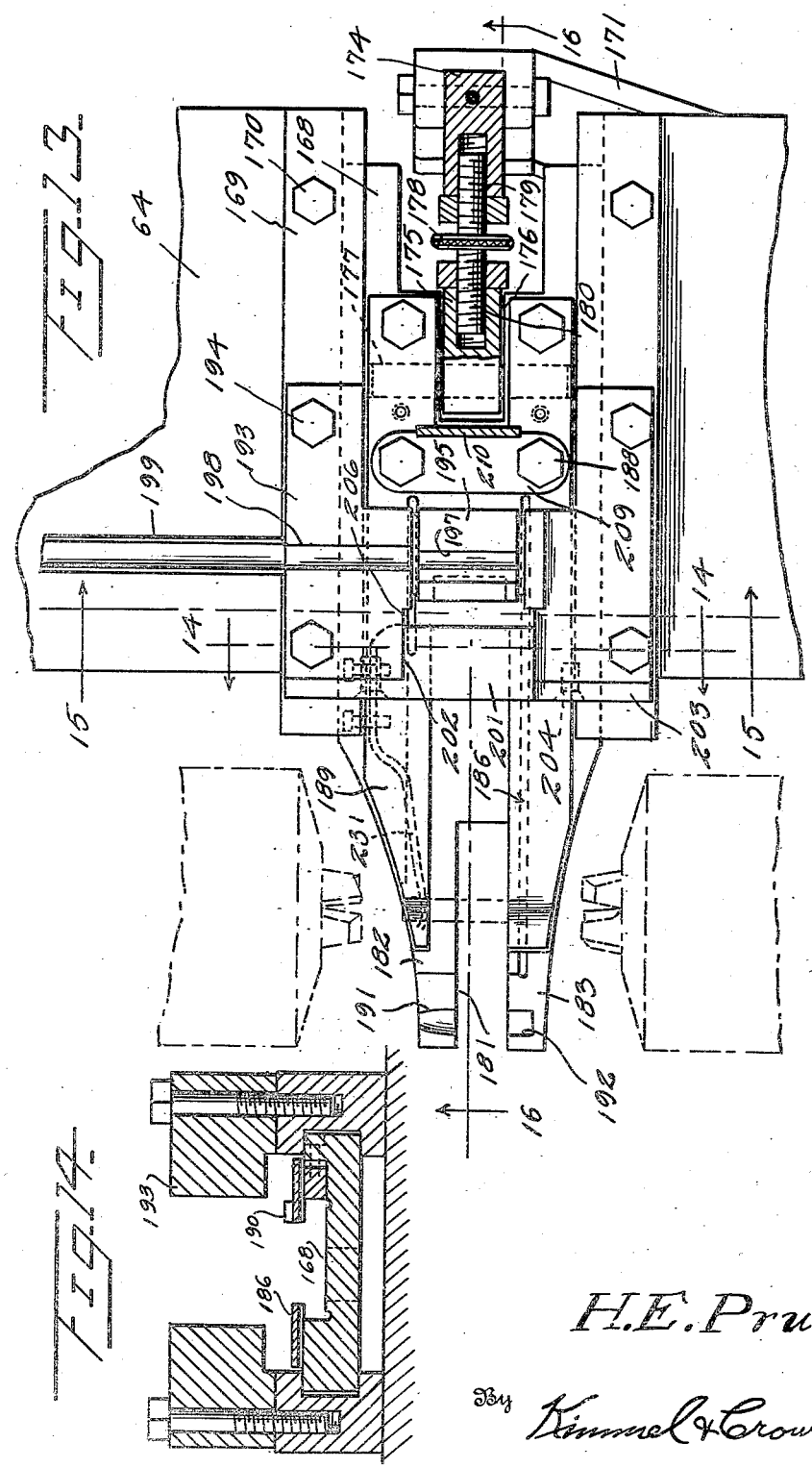

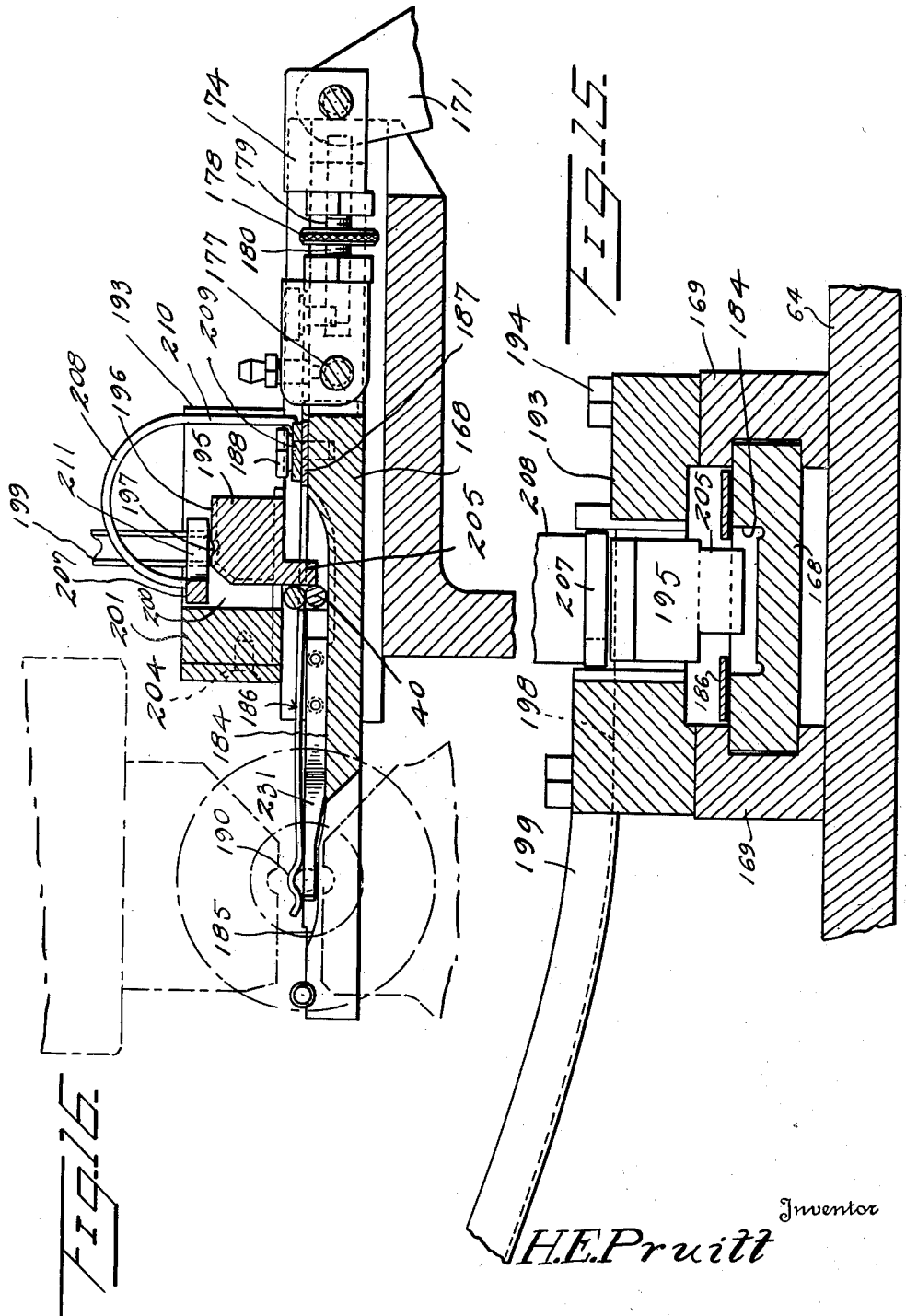

Nov. 12, 1946.　　　H. E. PRUITT　　　2,411,110
METALWORKING MACHINE
Filed Dec. 3, 1942　　　14 Sheets-Sheet 14
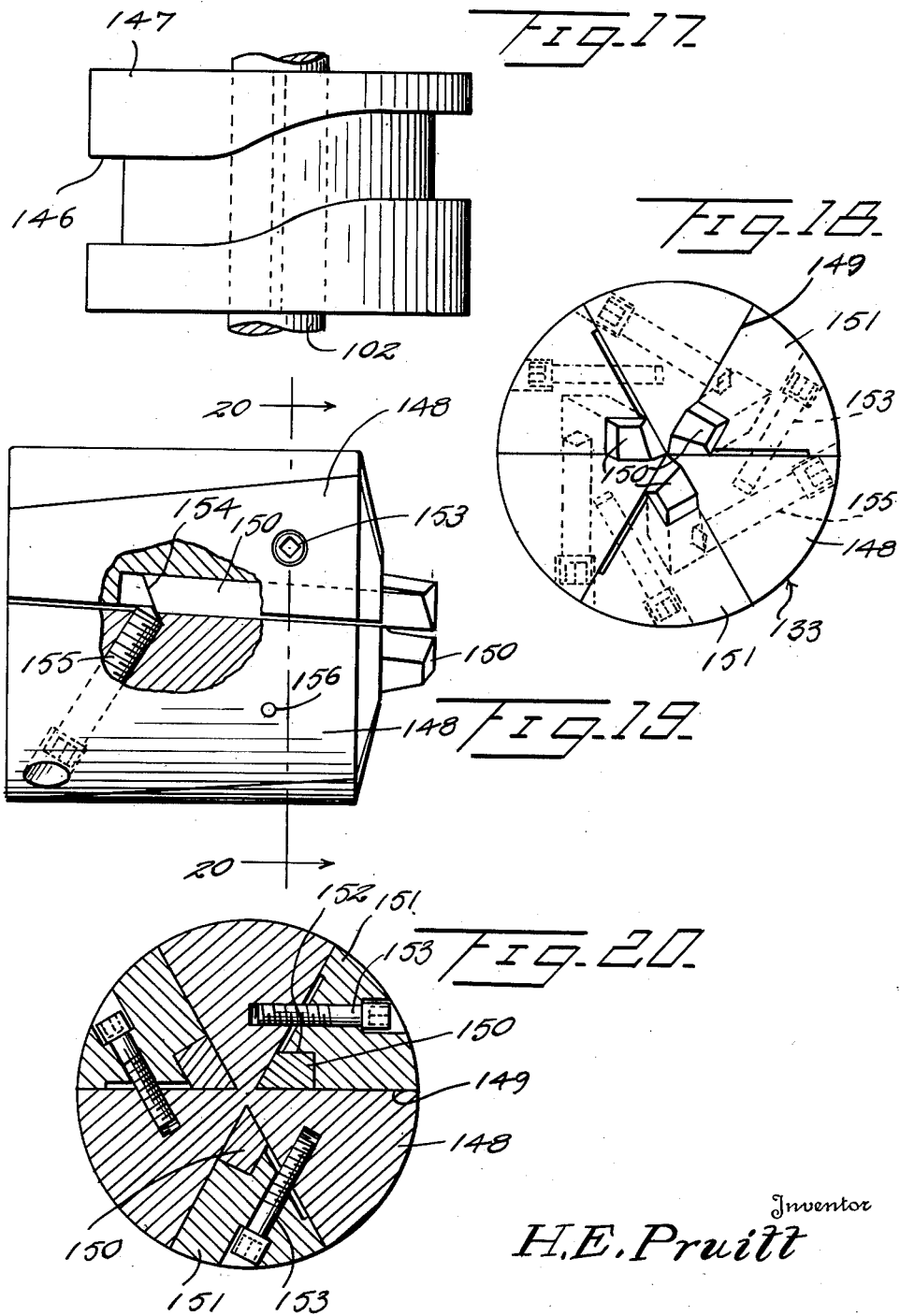
Inventor
H.E. Pruitt
By Kimmel & Crowell
Attorneys Patented Nov. 12, 1946

2,411,110

UNITED STATES PATENT OFFICE 2,411,110

METALWORKING MACHINE

Harvey E. Pruitt, Greenville, Mich., assignor of one-twentieth to Gibson Refrigerator Company, Greenville, Mich., a corporation of Michigan and nineteen-twentieths to Emery M. Rice, Hanna, Ind.

Application December 3, 1942, Serial No. 467,757

12 Claims. (Cl. 90—11)

This invention relates to metal working machines.

At the present time in the shaping of small objects out of metal, it is the practice to shape such objects on a machine known as a screw machine, but such machines are not entirely satisfactory from a production standpoint, and from the standpoint of precision. It is, therefore, an object of this invention to provide a machine capable of quantity production considerably in excess of the present screw machines which when put into operation will release such screw machines for other vital work.

Another object of this invention is to provide a machine which while readily adaptable for the production in quantity of various articles has been specially designed for the shaping of steel projectiles for the smaller caliber guns.

A further object of this invention is to provide a machine of this type which is automatic in its operation and which will accurately shape the opposite ends of a steel projectile in a single operation.

A further object of this invention is to provide a projectile forming machine which while capable of great quantity production is of quite simple construction and small in size.

A further object of this invention is to provide a metal working machine which is capable of shaping either one or both ends of a piece of metal, the machine being provided with an improved means for feeding the metal pieces to the shaping members, the feeding means also including means for ejecting the finished metal pieces prior to the injection of a new piece.

A further object of this invention is to provide a machine which includes opposed rotatable cutting or shaping members, and a pair of article clamping or gripping members positioned between the shaping members for firmly gripping the article and holding it stationary during the shaping operation.

A further object of this invention is to provide a machine of this type which is positive in its operation, the rectilinear movement of the parts being effected in timed sequence by means of cams and levers.

This invention consists of the novel construction, combination and arrangement of parts as will be more specifically referred to and as illustrated in the accompanying drawings wherein is shown as embodiment of this invention, but it is to be understood that changes, variations and modifications may be resorted to which fall within the scope of the invention as claimed.

In the drawings:

Figure 1 is a detail front elevation of a machine constructed according to an embodiment of this invention, Figure 2 is a detail end elevation, partly broken away, of the machine, Figure 3 is a top plan of the upper portion of the machine, Figure 4 is a detail front elevation on an enlarged scale of the upper portion of the machine, Figure 5 is a sectional view taken on the line 5—5 of Figure 1, Figure 6 is a sectional view taken on the line 6—6 of Figure 4, Figure 7 is a longitudinal section partly in detail of one of the spindle assemblies, Figure 7a is a fragmentary longitudinal section of the forward portion of the assembly shown in Figure 7, Figure 8 is a sectional view taken on the line 8—8 of Figure 6, Figure 9 is a sectional view taken on the line 9—9 of Figure 2, Figure 10 is a vertical section of the base portion of the machine, looking from one end thereof, Figure 11 is a sectional view taken on the line 11—11 of Figure 5, Figure 12 is a sectional view taken on the line 12—12 of Figure 5, Figure 13 is a fragmentary plan view partly in section of the feeding structure, Figure 14 is a sectional view taken on the line 14—14 of Figure 13, Figure 15 is a sectional view taken on the line 15—15 of Figure 13, Figure 16 is a sectional view taken on the line 16—16 of Figure 13, Figure 17 is a plan view of one of the spindle operating cams, Figure 18 is a detail end elevation of one of the cutter heads, Figure 19 is a detail side elevation partly broken away and in section of one of the cutter heads, Figure 20 is a sectional view taken on the line 20—20 of Figure 19, Figure 21 is a plan view of the lower anvil operating cam, Figure 22 is a detail side elevation of one of the blank slugs or work-pieces, Figure 23 is a detail side elevation of the slug or work-piece in furnished condition.

Figure 24 is a fragmentary sectional view showing in enlarged condition a portion of the structure shown in Figure 6, Figure 25 is a fragmentary vertical section partly in detail through the center of the machine showing the anvils in open position and the carriage in slug receiving position, Figure 26 is a view similar to Figure 25 but showing the finished slug discharged from the carriage and a new slug gripped between the anvils or clamping members, Figure 27 is a fragmentary sectional view taken on the line 27—27 of Figure 1, Figure 28 is a sectional view taken on the line 28—28 of Figure 5, and Figure 29 is a plan view of the lower anvil or clamping member.

Referring to the drawings, the numeral 30 designates generally a hollow base or supporting structure on the upper end of which is mounted a bed, generally designated as 31. The bed 31 includes a lower body 32 which is formed adjacent the opposite ends thereof with a pair of bearing members 33 and 34. The bearing members 33 and 34 are in axial alignment and the bearing member 33 has mounted therein for combined rotary and endwise movement a cutter assembly, generally designated as 35. The bearing 34 has mounted therein for combined rotary and endwise movement a cutter assembly, generally designated as 36. The two cutter assemblies 35 and 36 are of identical construction and the detailed description of one of these assemblies will apply equally as well to the other assembly.

An upper anvil or slug clamping member 37 is supported by a supporting head 38 in a position whereby the lower end portion of the anvil or clamping member 37 will be disposed medially between the inner confronting ends of the assemblies 35 and 36. A lower movable anvil or clamping member 39 is disposed in confronting position with respect to the upper anvil or clamping member 37 and coacts with the anvil 37 in firmly and tightly gripping a slug or workpiece 40 therebetween. The upper anvil or clamping member 37 comprises an elongated body 41 which is mounted in a channel 42 formed in the head 38. The body 41 is adapted to be maintained in vertically adjusted position by means of a plurality of clamping bolts or set screws 43 which are threaded through the head 38 and engage the adjacent edges of the body 41. The upper end 44 of the body 41 is cut off at an angle and a wedge block 45 is mounted in the upper portion of the channel 42 and bears against the upper end of the body 41.

The block 45 constitutes a means for vertically adjusting the body 41, and the block 45 is adjusted laterally with respect to the body 41 by means of a pair of opposed set screws 46 and 47 which are threaded through the head 38. The body 41 is provided with pairs of elongated openings 48 and bolts 49 are extended through the head 38 and the openings 48 to provide a means for limiting the vertical adjustment of the clamping member 37 in the head 38. The lower end of the anvil or clamping member 37 is provided with a reduced width portion 50 which of substantially less length than the space between the cutter assemblies 35 and 36 when these assemblies are shifted toward each other in their cutting operation.

The reduced lower or clamping end portion 50 of the anvil or clamping member 37 is formed with a concave recess or seat 51 within which the slug 40 is adapted to seat. The slug 40 is adapted to be automatically ejected from the recess 51 by means of a slug ejecting member, generally designated as 52. The ejecting member 52 comprises an elongated rod 53 which is slidable in a vertically disposed passage 54 provided in the body 41 and the lower end of the rod 53 is reduced as at 55 and slidably engages in a reduced passage or opening 56 formed in the reduced clamping member 50.

The upper end of the rod 53 has fixed thereto or formed integral therewith an annular flange 57 which is slidable in an elongated opening 58 formed coaxial with the opening or passage 54. A spring 59 is disposed in the opening 58 and bears at one end against the flange 57 and at the other or upper end against a spring tensioning plug 60 which is threaded through the upper portion of the body 41. The spring 59 constantly urges the slug ejecting pin 55 downwardly so that when the two clamping members or anvils 37 and 39 are in released position the pin 55 will automatically and positively eject the slug 40 from the recess 51.

The head 38 is formed integral with a supporting member 61 which is adapted to be secured by fastening members 62 and 63 to a table 64 which is carried by the bed 32 between and rearwardly of the bearings 33 and 34. The supporting member 61 is adapted to be accurately positioned with respect to the table 64 by means of a pair of dowels 65 which extend through the base portion 66 of the supporting member 61 and engage the table 64.

The bed 31 is formed with a cylinder 67 within which a vertically movable piston 68 is slidable. The piston 68 has fixed to the upper end thereof a lower movable clamping head or anvil 69 which is formed at its upper end with a reduced clamping member 70 confronting the upper stationary clamping member 50. The upper side of the clamping member 70 is formed with a concave seat 71 confronting the seat 51 and within which the slug 40 is adapted to engage. The forward upper portion of the clamping member 70 is formed with a rounded portion 72, the purpose for which will be hereinafter described.

The body 69 of the lower clamping member is formed with an annular depending flange or skirt 73 which is adapted to loosely engage about the upper end of the cylinder 67 so as to prevent any removed material from contacting with the piston 68. A rock lever 74 is rockably mounted on a shaft 75 which is mounted in bearings 76 and 77 carried by the bed 31. The lever 74 is connected with the piston 68 by means of a link 78 which at its upper end is mounted on a wrist pin 79 carried by the piston 68. The lower end of the link 78 is mounted on a pin 80 which is carried by the lever 74 upwardly from the shaft 75. The lever 74 is formed with an upwardly opening slot 81 within which the lower end of the link loosely engages and the piston 68 is formed with a slot 82 within which the upper portion of the link loosely engages. The piston 68 adjacent the upper portion thereof is formed with a lubricating passage 83 communicating with a passage 84 carried by the cylinder 67 and an oil cup 85 is connected with the cylinder passage 84 by means of a pipe 86. The upper horizontal passage 83 communicates with a vertical passage 87 formed in the piston 68, and the lever 78 is formed with a lubricating passage 88 communicating with the passage 87. The passage 88 extends downwardly through the link or lever 78 and communicates with an annular lubricating channel 89 formed in the pin 80. The shaft 75 has formed integral with the opposite ends thereof a pair of eccentrically disposed stub shafts 90 and 91 which are journalled in the bearings 77 and 76, respectively.

The stub shaft 91 at its outer end is formed with a splined portion 92 on which a shaft adjusting arm 93 is fixedly mounted. Swinging adjustment of the arm 93 will raise or lower the lever 74 so as to thereby provide for the desired vertical reciprocation of the piston 68 in order to provide for the desired clamping pressure being applied by the clamping member 70 on the slug 40. The arm 93 is held in adjusted position by means of a pair of opposed threaded adjusting members 94 and 95 which are threaded through bosses 96 and 97 carried by the bed 32.

The lever 74 is provided with an offset extension 98 on which a roller 99 is mounted. The roller 99 engages in a cam track 100 which is formed in a cam member 101 mounted on a rotatable cam shaft 102. The cam shaft 102 (shown more clearly in Figure 6) is rotatably mounted in bearings 103 and 104. The cam shaft 102 has fixed to one end thereof a sprocket 105 about which a driving chain 106 is trained. The chain 106 engages a driving sprocket 107 mounted on a drive shaft 108. The drive shaft 108 is connected with a gear reducing mechanism 109 of conventional construction which is operated from a shaft 110. The shaft 110 has a pulley 111 mounted on one end thereof and the pulley 111 has a belt or flexible drive member 112 trained thereabout. The belt 112 is also trained about a driving pulley 113 mounted on a motor shaft 114 driven by a motor 115.

The base 69 of the clamping member 39 is secured to the piston 68 by means of fastening members 116, and preferably positioning pins 117 which are seated in openings 118 engage through the base 69 so that the clamping member 39 will be properly positioned with respect to the clamping member 37.

Referring now to Figure 7, the spindle assembly 36 which is identical with the spindle assembly 35 comprises a cylindrical sleeve 119 which is slidable endwise in the bearing 34. The sleeve 119 has rotatable interiorly thereof a spindle or shaft 120 which is rotatable in anti-friction bearings 121 and 122 carried by the sleeve 119. The outer end portion of the spindle 120 has an annular nut 123 threaded thereon which is adapted to abut against the outer side of the bearing 122. A grooved pulley 124 is fixedly mounted on the outer end of the shaft 120 being removably secured by means of a nut 125 which is threaded on the shaft 120. The sleeve 119 at its outer end is formed with threads 126 on which a pair of lock nuts 127 are threaded. The nuts 127 provide means for limiting the inward sliding movement of the sleeve 119 during the cutting operation.

The shaft 120 adjacent the inner end portion thereof is formed with an annular flange 128 outwardly of the anti-friction bearings 121 and a sealing washer 129 is interposed between the flange 128 and the outermost of the bearings 121. The shaft 120 at its inner end portion is formed with a reduced threaded stud 130 and a pilot stud 131 which is disposed between the threaded stud and the flange 128. An annular ring-shaped boss 132 is formed on the inner side of the flange 128 and a tool chuck or head 133 is adapted at its outer end to bear against the ring-shaped boss 132. The chuck 133 is threaded onto the stud 130 and telescopes the pilot stud 131. The sleeve 119 adjacent the outer end portion thereof is formed with an enlarged bore or chamber 134 and a ring 135 is mounted in this enlarged bore and is adapted to provide a means for limiting the outward flow of lubricant which is discharged into the interior of the sleeve 119. The ring 135 is tightly pressed into the bore 134 and forms a reduced passage between the inner circle of the ring 135 and the periphery of the shaft 120. The sleeve 119 is formed with a longitudinal keyway 136 in the periphery thereof within which a key 137 is adapted to engage. The key 137 is mounted in a forwardly opening slot 138 formed in the bearing 34 and the key 137 is removably held in the keyway 136 by means of set screws 139 which are threaded downwardly through the bearing 34 and engage the upper side of the key 137. The key 137 holds the sleeve 119 against rotary movement but permits endwise sliding movement of the sleeve 119 under the action of a sleeve operating lever 140.

The lever 140 has one end thereof pivotally mounted on a threaded pivot member 141 which extends through the lever 140 and is threaded into the sleeve 119. The lever 140 is pivotally mounted on a pivot member 142 carried by the inner end of a link 143. The link 143 is mounted on an eccentrically disposed pivot member 144 which is fixed to the rear side of the bearing 34 so that adjustment of the pivot member 144 will shift the center of the pivot 142 inwardly or outwardly to provide for the desired movement of the lever 140. The opposite or rear end of the lever 140 has rotatably mounted thereon a roller 145 which engages in a cam track 146 formed in a cam member 147. The cam member 147 is fixedly mounted on the cam shaft 102 which is driven by means of the motor 115 through the reduction gearing 109.

The chuck 133 is formed of a cylindrical body 148 which is formed with a plurality of circumferentially arranged triangular slots 149. The slots 149 are inclined inwardly and downwardly from the outer end of the body 148 and a plurality of cutter members 150 are mounted in the cutouts 149. Segmental clamping members 151 which are formed at their inner portions with longitudinal cutouts 152 engage in the segmental openings 149 and are tightly secured therein by means of clamping screws 153. Tightening of the screws or bolts 153 which are threaded into the body 148 as shown in Figure 20 will tightly clamp the cutter 150 in the seat or cut out 149. Each cutter or tool 150 is formed with a bevelled inner end portion 154 against which a cutter adjusting screw 155 is adapted to engage. The screw 155 is mounted on an angle to the longitudinal axis of the body 148 so that inward adjustment of the screw 155 will force the cutter 150 outwardly of the chuck. In the present instance, there are three of these cutters but it will of course be understood that the number of these cutters may be varied as may be desired.

The periphery of the body 148 is formed with circumferentially spaced apart recesses or sockets 156 for receiving a spanner wrench and if desired, the front face of the chuck body 148 may be provided with similar spanner wrench recesses 156. The pulley 124 is preferably a multiple grooved pulley and a plurality of driving belts 157 are trained about the pulley 124 and about a driving pulley 158 mounted on a motor shaft 159. The motor shaft 159 is driven by a motor 160 which is secured in vertically adjusted position to the front wall 161 of the base or supporting structure 30 by means of motor adjusting bolts 162. The adjusting bolts 162 extend through vertically elongated openings 163 which are formed in the front wall 161. The motor 160 has connected therewith a switch 164 and the motor 165 for the spindle assembly 35 has connected therewith a switch 166. The cam shaft motor 115 has connected therewith a switch 167 and preferably the switches 164, 166 and 167 are so connected together that the switch 167 for connecting the motor 115 with the power source cannot be connected with the power source until both switches 164 and 166 have been moved to a circuit closing position. In this manner the cam shaft 102 with the operating means connected therewith cannot be operated before the spindle assemblies 35 and 36 are rotating.

A horizontally reciprocable carriage 168 is slidable in opposed guides 169 which are secured to the table 64 by fastening members 170. The carriage 168 is reciprocated toward or away from the spindle assemblies 35 and 36 by means of a rockable lever 171. The lever 171 is pivotally mounted as at 172 on a rearwardly projecting boss 173 carried by the bed 31 on the rear side thereof. The lever 171 has pivotally mounted in the upper end thereof a block 174 and the carriage 168 has a block 175 rockably mounted in a slot 176. The block 175 is mounted on a pin or shaft 177 extending through the slot 176 and mounted in the carriage 168. The two blocks 174 and 175 are adjustably connected together by a threaded adjusting member 178 which includes oppositely threaded portions 179 and 180.

The carriage 168 at its forward end is formed with a forwardly opening slot 181 which is of sufficient width to permit the arms 182 and 183 formed on opposite sides of the slot 181 to engage on opposite sides of the slug and clamping members 50 and 70 when the carriage 168 is in its forward position. The carriage 168 is formed in the upper side thereof with an elongated passage 184 which at the forward portion of the carriage 168 rises upwardly as at 185. A bifurcated spring 186 which is provided with a base plate 187 is secured by fastening members 188 to the upper side of the carriage 168. The arms 189 of the spring 186 are disposed in overlapping position with respect to the slot 184 and are adapted to engage the opposite ends of a slug 40 which movably engages within the recess 184.

The forward ends of the arms 189 of the spring 186 are provided with upwardly offset slug retaining portions 190 for holding the slug 40 against movement lengthwise of the carriage 168. The arm 182 of the carriage 168 is formed with an upwardly opening slug seat 191, and the arm 183 is formed with an upwardly opening slug seat 192 aligning axially with the recess 191. The two recesses 191 and 192 comprise delivery recesses for ejecting the formed slug from the carriage 168 when the lower anvil or clamping member 39 is moved upwardly to a clamping or gripping position.

In order to provide a means whereby the blank slugs may be fed to the carriage 168 at each reciprocation thereof, I have provided a block 193 which is secured by fastening members 194 to the upper sides of the guide members 169 adjacent the forward portions thereof. The block 193 is formed centrally thereof with a transversely extending connecting member 195 which is provided in the upper side 196 thereof with a concave slug seat 197. One side of the block 193 is formed with an upwardly opening slug guiding channel 198 aligning with the seat 197 and a slug guiding chute 199 is disposed in alignment with the guide chute or passage 198. The chute 199 is adapted to be correlated with a suitable hopper structure (not shown) for feeding the slugs downwardly to the block 193. The block 193 is formed with a slug guiding channel or hopper 200 forwardly of the connecting member 195, the hopper or channel being formed by a block 201 disposed in a cutout 202 formed in the block 193 and provided with wings 203 which are secured by fastening members 204 to the forward face of the block 193. The slug supporting block or connecting member 195 is formed with a depending lug or extension 205 which is adapted to extend into the recess 184 between the arms of the spring 186. The spring 186 adjacent the rear ends of the arms 189 thereof is formed with an enlarged cutout 206 which is of a width slightly greater than the width of the channel 184 so that the slugs 40 dropping downwardly through the passage or hopper 200 may drop downwardly by gravity into the passage 184. At each forward movement of the carriage 168, a slug 40 is kicked off from the seat 197 by means of a kick-off block 207 which is secured to a U-shaped spring 208. The spring 208 is formed with a right angular base portion 209 integral with the rear leg 210 thereof and the base 209 is secured between the heads of the fastening members 188 and the upper side of the rear portion 187 of the spring 186. The kick-off block 207 on one end thereof is formed with a horizontally disposed wing 211 which is adapted to confront the adjacent end of the trough or chute 198 so that when the kick-off member 207 forces a slug from the seat 197 into the hopper 200, the next succeeding slug in the trough 198 will be prevented from moving onto the seat 197 until the carriage 168 has moved rearwardly to an inoperative position.

The carriage 168 is reciprocated back and forth by means of a cam 212 which is formed integral with the cam 101 at one end of the latter. The lever 171 has rotatably secured thereto a roller 213 which is adapted to ride on the periphery of the cam 212. The cam 212 is formed with a cam portion 214 offset inwardly from the periphery of the cam and is also formed with a second cam portion 215 which is offset inwardly from the cam portion 214. The trailing end of the cam portion 215 merges with an outwardly extending cam portion 216, the purpose for which will be hereinafter described. The cam 212 also includes a dwell portion 217 which is equal to substantially one-half of the circumference of this cam. The roller 213 is adapted initially to drop downwardly to the cam portion 214 and the lever 171 is pulled forwardly under the action of a spring 218 which is connected at one end to an ear 219 carried by the lever 171. The spring 218 at the opposite end thereof is connected to an adjusting bolt 220 so that the roller 213 will be yieldably held in contact with the peripheral surface of the cam 212. The spring 218 is of sufficient strength to move the carriage 168 forwardly when the roller 213 drops into the cam portions 214 and 215. At the time the roller 213 engages the first cam portion 214, the carriage 168 is moved forwardly to the position shown in Figure 25 where the slug receiving seats 191 and 192 are disposed beneath the formed slug.

At this time the lower clamping member 39 is lowered under the action of the cam 101 and the formed slug 40 drops into the seats 191 and 192 being assisted in dropping into the seats 191 and 192 by means of the spring pressed ejecting member 52. Continued rotation of the cam 212 will cause the roller 213 to drop onto the cam surface 215 thereby shifting the carriage 168 forwardly to the position shown in Figure 26. At this time, the slug 40 which is gripped by the gripping fingers 190 of the spring arms 189 will be disposed in confronting position to the clamping faces 51 and 71 and the formed slug will be disposed forwardly of these clamping faces. The lower movable clamping member 39 will then be raised to a clamping position by means of the cam 101 which will rock the lever 98, raising the piston 68 to a clamping position. When the lower clamping member 39 rises to a clamping position, the formed slug 40 resting in the seats 191 and 192 will be lifted off from these seats and rolled forwardly by the curved ejecting portion 72 formed on the forward portion of the lower clamping member 70.

The upward movement of the lower assembly 39 will lift the blank slug 40 from the recess 184 in the forward portion of the carriage 168, also raising the arms 189 of the spring 186 to the position shown in Figure 26. Further rotation of the cam 212 through the cam portion 216 will cause the roller 213 to effect rearward movement of the carriage 168 thereby pulling the spring arms 189 from the now gripped blank slug 40.

At the time the carriage 168 is at its foremost position, which is the position shown in Figure 16, a blank slug 40 will drop downwardly from the hopper 200 into the rear portion of the recess 184. Rearward movement of the carriage 168 will position the slug gripping fingers 190 over the slug which will be held against rearward movement by the lug or stop member 205 as the carriage 168 moves rearwardly. Upon forward movement of the carriage 168 to the combined discharge and delivery position, which is the position shown in Figure 16, a second slug will be pushed off of the seat 197 by the push member or kick-off bar 207. The second or uppermost of the slugs 40 in the hopper 200 will provide sufficient weight so that the lowermost slug, which at this time is riding on the upper surfaces of the spring arms 189, will be forced downwardly into the slug receiving channel 184 when the carriage 168 is in its foremost position.

In order to provide a means whereby a cutting fluid may be discharged onto the cutters 150, during the operation of the machine, I have provided a centrally disposed bore 214a which is provided in the spindle or shaft 120 and a communicating bore 215a is provided in the chuck 133. The outer end of the spindle or shaft has swivelly mounted thereon a connector 216a which is connected with a flexible hose 217a. The hose 217a is connected at its lower end to an L 218a mounted on the outer end of a fluid conducting pipe 219a. The pipe 219a extends into the base 30 and is connected with a pump 220a mounted interiorly of the base 30. The pump 220a has a pulley 221 connected with the shaft 222 thereof and a belt 223 is trained over the pulley 221 and over a pulley 224 mounted on the motor shaft 114. The fluid which is ejected from the bore 215a in the head or chuck 133 drops downwardly onto the table 64 and then drops into a well 225 formed in the upper portion of the base 30. The well 225 is provided with a sump 226 within which a screen 227 is mounted. The screen 227 is mounted on the upper end of a suction pipe 228 which is connected with the suction side of the pump 220.

In the use and operation of this machine, the motors 160 and 165 are initially started by closing of the switches 164 and 166 in succession and then the switch 167 may be closed to start the motor 115. Rotation of the cam shaft 102 by the chain drive 106 will rotate the several cams causing reciprocation by means of the cams 147 of the opposed sleeves 119. Prior to the inward movement of the sleeves 119 with the cutter heads 133, the carriage 168 will be shifted forwardly by means of the cam 212. The cam portion 214 on the cam 212 will cause the carriage 168 to hesitate or stop with the slug receiving recesses 191 and 192 positioned in vertical alignment with the recesses 51 and 71 formed in the gripping members 37 and 39.

The formed slug will drop partly by gravity and partly under the action of the ejecting pin 55 into the recesses 191 and 192, whereupon continued rotation of the cam 212 will by means of the cam portion 215 cause the carriage 168 to move forwardly an additional distance bringing the blank slug 40 into vertical alignment with the seats 51 and 71. At this time, the cam 101 will effect upward movement of the movable clamping member 39 which will move between the arms 182 and 183 of the carriage and will raise the blank slug to the position shown in Figure 26. Coincident or simultaneously with the gripping of the blank slug by the upward movement of the lower clamping member 39, the previously formed or shaped slug 40 which is disposed in the recesses 191 and 192 will be lifted outwardly of these recesses by the ejecting portion 72 formed on the forward upper portion of the gripping element 70. The formed slug will then roll forwardly off of the end of the carriage and will drop into a hopper 229 and move downwardly in a trough or guide member 230 for discharge into a suitable receiver (not shown) which may be positioned adjacent the machine.

In order to provide a means whereby the slug will be disposed in the same position at all times with respect to the two clamping members 37 and 39, I have provided a spring 231 which is mounted in the channel 184 of the carriage and bears against one end of the slug when the latter is in a gripping position beneath the gripping portions 190 of the spring fingers 189.

After the lower gripping member 39 has moved upwardly to a clamping or gripping position, the cam 212 by means of the cam portion 216 will move the carriage rearwardly at which time a slug which has been pushed off of the seat 197 will be held against rearward movement so that the gripping fingers 190 may grip the slug dropping into the channel 184 at the rearmost position of the carriage 168. With the slug firmly gripped between the two clamping or gripping members 37 or 39 rotation of the cam shaft 102 will cause the opposed sleeves 119 to move inwardly toward each other thereby moving the cutter heads 133 to a position where the cutting members 150 will shape the opposite ends of the slug. In the present instance, the slug 140 will have one end thereof shaped as at 232 and the opposite end shaped as at 233 as shown in Figure 23. The completed or finished slug forms a projectile for insertion in a cartridge shell.

It will be understood that the spindle or shaft 120 is continuously rotating so that the slug 40 will be progressively cut and shaped during the inward movement of the opposed cutting heads 133. After the slug has been shaped which operation occurs at the innermost positions of the cutters 150 and the cutter heads 133, the cam members 147 will effect outward movement of the sleeves 119 and at this time the carriage 168 is moved forwardly to a position where the recesses 191 and 192 are beneath the formed slug which is still gripped between the gripping or clamping members 37 and 39. The cam 101 will then effect downward movement of the lower clamping or gripping member 39 and the finished slug will drop into the slug receiving recesses 191 and 192. The further cycle of operation is a repetition of that hereinbefore described.

What I claim is:

1. In a metal working machine, a pair of confronting rotary cutter members, means reciprocating said members during rotation thereof, a pair of opposed clamping members between the confronting ends of said members, means fixedly supporting one of said clamping members, means reciprocating the other of said clamping members, a reciprocal carriage, means reciprocating said carriage, said carriage having a bifurcated forward delivery end engageable on opposite sides of said clamping members when said carriage is in a forward work piece delivery position, and means yieldably holding a work piece on the upper side of said bifurcated end, said carriage being so positioned with respect to said clamping members that movement of said other clamping member toward clamping position will lift the work piece from said carriage.

2. In a metal working machine, a pair of confronting rotary cutter members, means reciprocating said members during rotation thereof, a pair of opposed clamping members between the confronting ends of said members, means fixedly supporting one of said clamping members, means reciprocating the other of said clamping members, a reciprocal carriage, means reciprocating said carriage, said carriage having a bifurcated forward delivery end engageable on opposite sides of said clamping members when said carriage is in a forward work piece delivery position, means yieldably holding a work piece on the upper side of said bifurcated end, said carriage being so positioned with respect to said clamping members that movement of said other clamping member toward clamping position will lift the work piece from said carriage, said carriage having opposed work piece seats at the forward end thereof, and cam operated means for initially shifting said carriage forwardly to dispose said seats beneath the clamped work piece, the work piece dropping onto said seats upon movement of said other clamping member to released position, said cam operated means subsequently shifting said carriage forwardly an additional distance to dispose a second work piece between said clamping members, movement of said other clamping member to clamping position also unseating the work piece from said seats.

3. In a work piece shaping machine, a reciprocal delivery carriage, said carriage comprising an elongated body formed with a channel in the upper side thereof, said body having a bifurcated forward end, a bifurcated spring fixed to the upper side of said body with portions of the arms of said spring overlying the opposite longitudinal edges of said channel, stationary hopper means overlying said carriage, said spring being formed with confronting cutouts in the rear portions of the arms thereof, a depending lug carried by said hopper means and engaging in said channel between the arms of said spring, a work piece holding seat rearwardly of said hopper, and delivery means fixed relative to said carriage engageable with the work piece on said seat for delivering the work piece into said hopper on each forward movement of said carriage.

4. In a work piece shaping machine, a reciprocal delivery carriage, said carriage comprising an elongated body formed with a channel in the upper side thereof, said body having a bifurcated forward end, a bifurcated spring fixed to the upper side of sad body with portions of the arms of said spring overlying the opposite longitudinal edges of said channel, stationary hopper means overlying said carriage, said spring being formed with confronting cutouts in the rear portions of the arms thereof, a depending lug carried by said hopper means and engaging in said channel between the arms of said spring, a work piece holding seat rearwardly of said hopper, delivery means fixed relative to said carriage engageable with the work piece on said seat for delivering the work piece into said hopper on each forward movement of said carriage, means guiding work pieces to said seat, and means carried by said delivery means for cutting off said guiding means when said delivery means is in delivery position.

5. In a metal working machine, a work piece clamping means comprising an upper stationary clamping member, a lower reciprocal clamping member, said lower member comprising a vertically slidable body, a clamping head secured to the upper end of said body, a rock shaft below said body, a rock lever on said shaft, means for rocking said lever, link means connecting said lever with said body, eccentrically disposed stub shafts carried by the ends of said first shaft, bearings for said stub shafts, an adjusting arm fixed to one of said stub shafts, and means holding said arm in adjusted position.

6. A metal shaping machine comprising opposed rotary cutter members, a stationary work clamping member, a complementary vertically movable clamping member, a work delivery carriage movable toward or away from said clamping members, and correlated timed means for moving said carriage to delivery position prior to the movement of said movable clamping member to clamping position, said carriage being formed with a work piece seat adapted to be disposed beneath the work piece when the carriage is in its rearmost position to thereby receive the formed work piece when said movable clamping member moves downwardly to released position, forward movement of said carriage on the delivery cycle thereof disposing the formed work piece in a position whereby upward movement of said movable clamping member to clamping engagement with a new work piece will lift the formed work piece from said seat and discharge the formed work piece from said carriage.

7. A metal working machine comprising opposed rotary cutter members, a stationary work clamping member, a complementary movable clamping member, a reciprocal work delivery carriage movable toward or away from said clamping members, means for reciprocating said carriage, and means correlated with said latter means for moving said movable clamping member toward or away from said stationary clamping member, said carriage being formed with a work piece seat adapted to be disposed beneath the work piece when the carriage is in its rearmost position to thereby receive the formed work piece when said movable clamping member moves downwardly to released position, forward movement of said carriage on the delivery cycle thereof disposing the formed work piece in a position whereby upward movement of said movable clamping member to clamping engagement with a new work piece will lift the formed work piece from said seat and discharge the formed work piece from said carriage.

8. A metal working machine comprising opposed rotary cutter members, a stationary work clamping member, a complementary movable clamping member, a reciprocal work delivery carriage movable toward or away from said clamping members, means for reciprocating said carriage, means correlated with said latter means for moving said movable clamping member toward or away from said stationary clamping member, and means operable upon movement of said movable clamping member away from said stationary clamping member for ejecting the formed work from said stationary clamping member, said carriage being formed with a work piece seat adapted to be disposed beneath the work piece when the carriage is in its rearmost position to thereby receive the formed work piece when said movable clamping member moves downwardly to released position, forward movement of said carriage on the delivery cycle thereof disposing the formed work piece in a position whereby upward movement of said movable clamping member to clamping engagement with a new work piece will lift the formed work piece from said seat and discharge the formed work piece from said carriage.

9. A metal working machine comprising opposed rotary cutter members, a stationary and a movable work clamping member between said cutter members, means reciprocating said cutter members toward or away from said clamping members, a combined work feeding and ejecting carriage, and means reciprocating said carriage in timed relation to the reciprocation of said cutter members, said carriage being formed with a work piece seat adapted to be disposed beneath the work piece when the carriage is in its rearmost position to thereby receive the formed work piece from said clamping members when the movable clamping member moves to a released position, a work piece discharge member carried by said movable clamping member, forward movement of said carriage on the delivery cycle thereof disposing the formed work piece in a position whereby movement of said movable clamping member to clamping position to engage a new work piece will lift the formed work piece from said seat and discharge the formed work piece from said carriage.

10. A metal working machine comprising opposed rotary cutter members, a stationary and a movable work clamping member between said cutter members, means reciprocating said cutter members toward or away from said clamping members, a feeding carriage movable toward or away from said clamping members, and means operable by movement of said carriage toward said clamping members for delivering a work piece to said carriage, said carriage being formed with a work piece seat adapted to be disposed beneath the work piece when the carriage is in its rearmost position to thereby receive the formed work piece from said clamping members when the movable clamping member moves to a released position, a work piece discharge member carried by said movable clamping member, forward movement of said carriage on the delivery cycle thereof disposing the formed work piece in a position whereby movement of said movable clamping member to clamping position to engage a new work piece will lift the formed work piece from said seat and discharge the formed work piece from said carriage.

11. A metal working machine comprising a pair of confronting rotary cutter members, means reciprocating said members during rotation thereof, a pair of opposed work piece clamping members between the confronting ends of said members, means reciprocating at least one of said clamping members to operative clamping position or inoperative work piece releasing position, a work piece discharge member carried by said one clamping member, and means delivering a work piece to said clamping members, said latter means being so formed and correlated with said movable clamping member whereby movement of said latter means on the delivery cycle thereof will simultaneously position the formed work piece in a position whereby movement of said one clamping member to clamping position will discharge the formed work piece from said latter means.

12. In a metal working machine, a pair of confronting rotary cutter members, means reciprocating said members during rotation thereof, a pair of opposed clamping members between the confronting ends of said members, means fixedly supporting one of said clamping members, means reciprocating the other of said clamping members, a work piece discharge member carried by said other clamping member, a reciprocal carriage, and means reciprocating said carriage, said carriage having a bifurcated forward delivery and engageable on opposite sides of said clamping members when said carriage is in a forward work piece delivery position, said carriage being formed with a work piece seat adapted to be disposed beneath the work piece when the carriage is in its rearmost position to thereby receive the formed work piece when said other clamping member moves downwardly to released position, forward movement of said carriage on the delivery cycle thereof disposing the formed work piece in a position for engagement by said discharge member whereby upward movement of said other clamping member will lift the formed work piece from said seat and discharge the work piece from said carriage.

HARVEY E. PRUITT.